UNITED STATES PATENT OFFICE 2,397,705

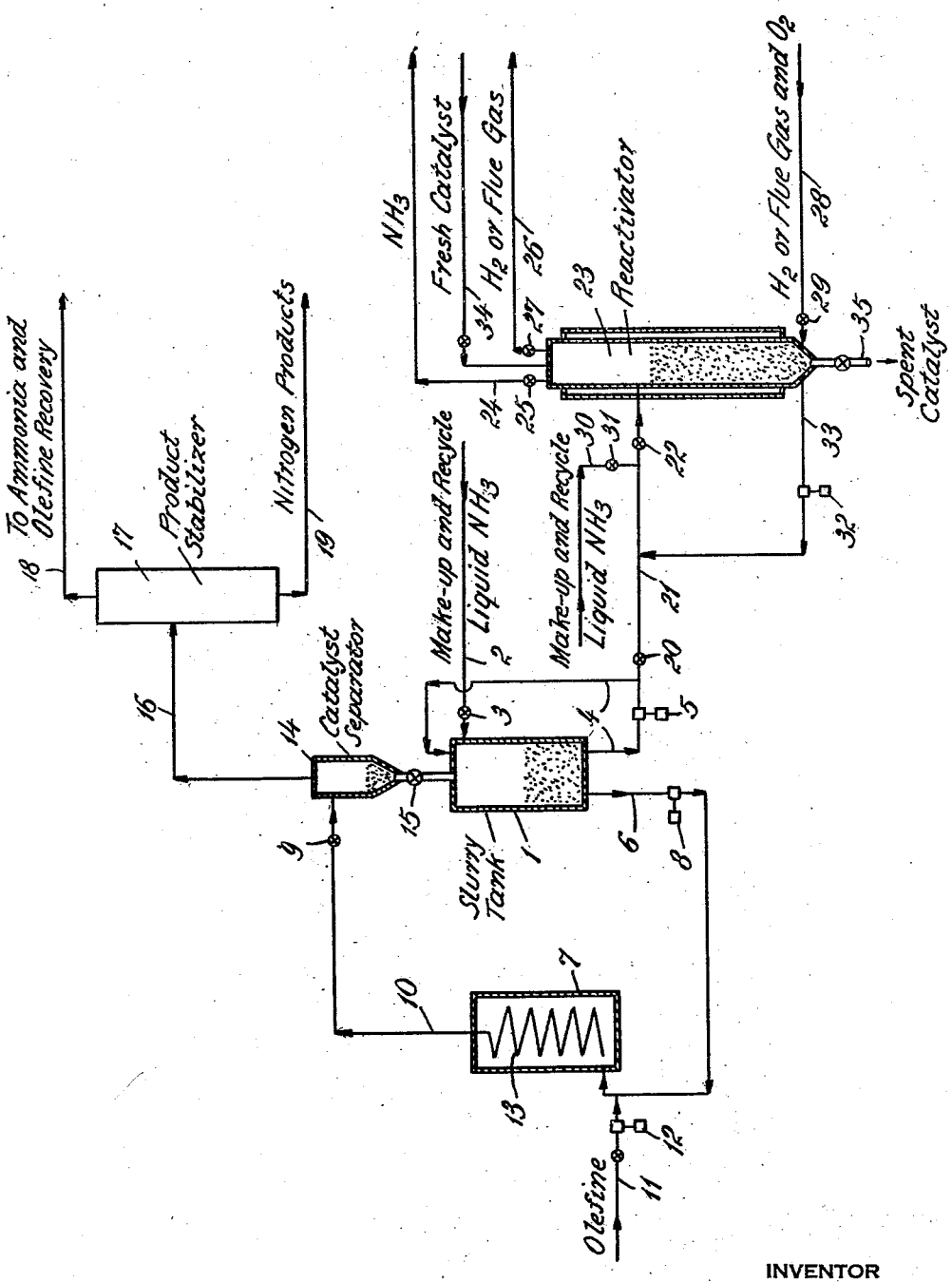

AMINATION OF OLEFINS

John W. Teter, Chicago, Ill., assignor to Sinclair Refining Company, New York, N. Y., a corporation of Maine Application February 4, 1943, Serial No. 474,654

7 Claims. (Cl. 260—585)

This invention relates to the production of organic nitrogen compounds by reacting olefins with ammonia at an elevated temperature and under superatmospheric pressure in the presence of a catalyst.

The amination of olefins by reaction with ammonia has been found to be commercially feasible, under elevated temperature and pressure conditions, when the reaction is carried out in the presence of a catalyst capable of selectively promoting the amination reaction. Cobalt and nickel have been found to be particularly effective for this purpose and are used advantageously in the form of a deposit of the metal on so-called carriers. In a particularly satisfactory embodiment of such a process, the amination reaction is carried out while the olefin and ammonia are in contact with a finely-divided or powdered catalyst suspended therein.

Although the catalysts used selectively promote the amination reaction, competing side reactions such as cracking, polymerization, hydrogenation and dehydrogenation also take place with resulting consumption of the olefin and production of compounds other than the desired amination product. The effectiveness of the catalysts in promoting the amination reaction, and also the extent of the competing side reactions, has been found to be materially influenced by the temperature and pressure at which the reaction is conducted as well as by the relative proportions of ammonia and olefins charged to the reaction, the proportion of catalyst employed, and the time of contact between reactants and catalyst. Optimum operating conditions have been found to vary with the particular olefin or olefins being aminated.

In commercial operation these operating conditions of temperature, pressure, proportions and time of contact may readily be controlled within practical limits to give optimum results. For example, in an amination process for the production of nitriles from propylene and ammonia a mixture of ammonia and propylene in which the molar ratio of ammonia to propylene is about 3 to 7:1 may be brought into contact with a cobalt catalyst at a controlled temperature of about 650° F.–800° F. and under a controlled pressure of about 1000–3000 pounds per square inch.

However, an additional variable—the activity of the catalyst in selectively promoting the amination reaction—has presented a serious problem. The effectiveness of the catalysts in selectively promoting amination of olefin diminishes with use, and the other optimum operating conditions vary with the selective activity of the catalyst. Moreover, as the selective activity of the catalyst diminishes, the extent to which the side reactions play an undesirable role increases. Uniform operation at maximum efficiency and effectiveness has thus been extremely difficult if not impossible to maintain in practice heretofore.

Inasmuch as amination catalysts are relatively expensive, it is essential for practical economy of operation that their selective activity be restored when it drops below a useful value. Reactivation of these amination catalysts may readily be effected by subjecting them to the action of hydrogen at an elevated temperature for an effective period of time. In practice it has been necessary to interrupt the amination process at frequent intervals in order to reactivate the catalyst, the frequency with which the reactivation is carried out depending upon a balance of the economics of operating with a catalyst of degenerated selective activity and of interrupting the process with a concomitant period of nonproductivity.

The present invention provides a novel combination of process steps whereby an admixture of olefins and ammonia at optimum conditions of temperature, pressure and proportions is continuously brought into contact with an amination catalyst of substantially uniform and maximum selective activity, whereby most effective operation under optimum conditions is made possible without frequent interruption of the process. Recovery of unreacted olefins and ammonia leaving the reaction zone and return of these reactants to the reaction zone of the process are further provided in accordance with the invention.

This continuous and uniform operation is attained in accordance with my invention by forming and maintaining a slurry of the amination catalyst in liquid ammonia, continuously charging the slurry in further admixture with an olefin to an amination reaction zone, returning to the slurry-forming operation catalyst separated from the mixture leaving the amination reaction zone, and intermittently withdrawing a portion of the slurry and subjecting the catalyst component thereof to reactivation with return of the reactivated catalyst to the slurry-forming operation. The slurry withdrawn for reactivation of the catalyst is advantageously delivered to the reactivation zone in this form and ammonia is removed from the catalyst in the reactivating zone. Reactivation of the resulting substantially ammonia-free catalyst is effected by passing through a body of the catalyst a gaseous medium capable of reactivating catalyst of degenerated selective amination activity. The reactivated catalyst, together with fresh catalyst which may be needed for make-up, is advantageously slurried with liquid ammonia and returned to the slurry-forming operation. In this manner the amination reaction is carried out continuously with reactivation of a portion of the catalyst to maintain in the amination reaction zone catalyst of substantially uniform and high selective amination activity.

In accordance with my invention, the delivery of catalyst to the amination reaction zone and the delivery of catalyst to and from the reactivating zone may be effected advantageously by liquid flow through appropriate conduits without the necessity of using expensive handling equipment. Not only are the advantages of using a finely divided catalyst realized in the amination reaction in accordance with the invention, but the finely divided catalyst may be more readily separated from the reactants and reaction products and more effectively contacted with the reactivating medium than are catalysts used in the form of pellets or other coarse particles.

The invention will be further described and illustrated with reference to the accompanying drawing which represents diagrammatically and conventionally an embodiment thereof.

As shown in the drawing, a slurry of the catalyst is formed with liquid ammonia in a slurry tank 1. Liquid ammonia for making up and maintaining this slurry is charged to the slurry tank through line 2 and valve 3, the liquid ammonia comprising recycled ammonia recovered as described hereinafter together with fresh liquid ammonia to replace that consumed in the amination reaction. A uniform slurry is maintained within the slurry tank by a circulation line 4 having a circulating pump 5 disposed therein, the circulation line and pump serving to withdraw slurry from the bottom of the slurry tank and deliver it to the top of the tank. The pressure maintained within the slurry tank 1 is advantageously only such as is necessary to maintain the ammonia in the liquid phase, this pressure being generally of the order of about 300 pounds per square inch or lower.

A substantially continuous flow of the catalyst-liqiud ammonia slurry is withdrawn from the slurry tank through line 6 for delivery to a reactor 7. A pressure of the order of about 1000–3000 pounds per square inch, and advantageously of the order of about 3000 pounds per square inch is provided in the reactor by means of a high pressure pump 8 disposed in line 6 and a release valve 9 disposed in the discharge line 10 from the reactor. Olefin, such as a hydrocarbon mixture consisting essentially of the olefin such as propylene, for example, is charged to the lines 6 on the high pressure side of the pump 8 through line 11 and pump 12. The amount of olefin charged is preferably such as to establish within the reaction zone a ratio of ammonia to olefin conducive of optimum reaction conditions, molar ratios of about 3 to 7:1 being used with particular advantage for this purpose. The mixture of ammonia, olefin, and catalyst is passed through the coil 13 of the reactor 7 at the above-noted elevated pressure and is heated to a temperature of the order of about 500° F. to about 800° F. in order to effect the amination reaction.

The catalyst, unreacted ammonia and olefin, and the reaction products are discharged through the release valve 9 into a separator 14, such for example as a "cyclone" separator. The separator 14 is maintained, by means of the release valve 9, under a pressure substantially the same as that prevailing within the slurry tank 1. Catalyst separated from the reactants and reaction products in the separator 14 accumulates in the lower portion of the separator and is discharged through valve 15 into the slurry tank 1.

The reaction products, together with unreacted ammonia and olefin, are discharged from the separator 14 through line 16 into a product stabilizer 17. The mixture of reactants and reaction products is heated in the stabilizer to vaporize the unreacted ammonia and olefin which, together with volatile reaction products, pass off through line 18. The unvaporized amination product is withdrawn from the stabilizer through line 19 for appropriate recovery. The volatile products removed through line 18 are delivered to an appropriate recovery system, as described hereinafter, for separating and recovering the unreacted ammonia, and the hydrocarbons from which the ammonia has been separated are subjected to appropriate treatment to produce a hydrocarbon consisting predominantly of the olefin for return to the amination reaction zone.

If the foregoing cycle of finely divided catalyst from the slurry tank through the reactor and back to the slurry tank were to be continued without giving further attention to the catalyst, the catalyst would quickly degenerate through the optimum range of selective amination activity to a state of inactivity promoting the side reactions of polymerization, cracking, dehydrogenation, etc., to the ultimate exclusion of amination. In accordance with my invention, a portion of the body of slurry within the slurry tank is withdrawn from the circulating line 4 through valve 20 in line 21 and is delivered through valve 22 into a reactivation chamber 23 advantageously jacketed for control of the temperature within the reactivator. The reactivator is provided at the upper end thereof with an outlet line 24 and control valve 25 for releasing gaseous ammonia to a suitable compressor. The upper portion of the reactivator is further provided with a discharge line 26 and control valve 27 through which the reactivating gaseous medium may be carried away. As soon as a substantial body of catalyst-liquid ammonia slurry is charged to the reactivator 23, the valves 20 and 22 in the charging line 21 are closed and hydrogen is introduced into the lower portion of the reactivator through line 28 and valve 29. The hydrogen thus charged to the reactivator strips ammonia from the slurry and this ammonia is recovered by opening valve 25 in line 24 and by closing valve 27 in line 26. After the ammonia has been substantially stripped from the catalyst within the reactivator, valve 25 is closed and valve 27 is opened for removal of hydrogen from the reactivator as it passes upwardly through the catalyst from the hydrogen supply line 28.

Hydrogen is passed upwardly through the finely divided catalyst within the reactivator 23 for a sufficient period of time to restore to the catalyst the desired high selective amination activity. The temperature of the catalyst within the reactivator may be raised to facilitate the reactivation by circulating a heated medium, such as molten salts, through the jacket of the reactivator. When the catalyst has been reactivated, valve 29 in the hydrogen supply line is closed, valve 22 in the reactivator charge line 21 is opened, and liquid ammonia is charged to the reactivator through line 21 from the ammonia supply line 30 and valve 31. The liquid ammonia thus charged to the reactivator forms a slurry with the catalyst. Slurrying is enhanced by means of the circulating pump 32 disposed in line 33 communicating between the lower portion of the reactivator 23 and the reactivator charge line 21, whereby catalyst and liquid ammonia may be withdrawn from the bottom of the reactivator and returned to the upper portion of the reactivator. As soon as a uniform slurry is formed within the reactivator, valve 22 is closed, valve 20 is opened, and the slurry is pumped through line 33 into line 21 and thence into the circulating line 4 of the slurry tank 1.

Withdrawal of a portion of the catalyst-liquid ammonia slurry from the slurry tank 1 for reactivation and return of the reactivated catalyst to the slurry tank is carried out at intervals sufficiently frequent to maintain within the slurry tank a mass of finely divided catalyst of sustained high selective amination activity. This is effected in accordance with my invention without sacrificing the advantages concomitant with continuous carrying out of the amination reaction itself. By maintaining within the slurry tank a sufficiently large body of catalyst as a reservoir for the amination reaction and for the reactivating operation, the reactivating operation may be carried out without impairing the effectiveness of the continuous amination operation while at the same time maintaining within the slurry tank a mass of catalyst having a sufficiently high selective amination activity to promote the amination reaction and to minimize the competing side reactions. Fresh catalyst may be charged to the system as desired through line 34 communicating with the upper portion of the reactivating chamber 23.

After continued use, it is necessary to regenerate the catalyst by oxidation or burning of the hydrocarbons which gradually accumulate therein or thereon. Such regeneration may be required in my improved process about once a month and may be accomplished without discontinuing the amination operation by withdrawing a portion of the slurry from the circulating line 4 through line 21 into the reactivator and by substituting oxygen or other oxygen-containing gas for the hydrogen introduced into the reactivator through line 28. In the course of this oxidation, the metallic catalyst such as nickel, cobalt, or the like, is converted to the oxide. The catalyst leaving the amination reaction zone and formed into a slurry in the slurry tank 1 is normally at a temperature sufficiently high to initiate combustion of the organic constituent thereof upon contact with the oxygen-containing gas in the reactor, and a temperature sufficient to effect the desired oxidation is maintained by subsequent combustion of the organic constituent of the degenerated catalyst. Accordingly, the external application of heat to the reactivator for regeneration of the catalyst is not necessary and generally it is necessary to employ a heat absorbing medium in the jacket of the reactivator to hold the combustion temperature of the catalyst below about 800° F. The oxygen-containing gas such as air may be diluted with hot flue gases to assist in this temperature control of the catalyst during the burning operation. After the oxidation has been completed, the introduction of oxygen-containing gas through the line 28 is discontinued and hydrogen or a hydrogen-containing gas is substituted therefor so as to reduce the oxidized metallic catalyst to the active metal form. The regenerated catalyst is then slurried with liquid ammonia and returned to slurry tank 1.

At such time as the catalyst is no longer adapted to be regenerated by this procedure, the spent catalyst may be discharged from the bottom of the regenerating chamber through line 35 for chemical recovery of the metallic constituent of the catalyst.

The unreacted olefin and ammonia withdrawn from the product stabilizer through the line 18 further contains, usually, other hydrocarbons, both saturated and unsaturated, produced by the aforementioned competing side reactions of cracking, polymerization, dehydrogenation and hydrogenation. The ammonia may be separated therefrom by aqueous absorption and distillation or by cooling and decantation from the hydrocarbons of the mixture in accordance with the process of the application of myself and Robert H. Stockey, Serial No. 470,450, filed December 29, 1942. The ammonia recovered by either procedure is returned to the amination process as a source of much of the ammonia required in the amination reaction zone. The hydrocarbons from which the ammonia has been separated are subjected to appropriate treatment to produce a hydrocarbon consisting predominantly of the olefin, and the latter is advantageously returned as an important source of the olefin required in the amination reaction zone.

I claim:

1. In the amination of olefins wherein an olefin and ammonia are reacted at an elevated temperature and pressure in the presence of a finely divided catalyst capable of selectively promoting the amination reaction, the improvement which comprises forming a slurry of the catalyst in liquid ammonia, delivering a portion of the slurry in further admixture with an olefin to a reaction zone wherein the mixture is heated to an elevated temperature to effect the amination reaction, separating the catalyst from unreacted ammonia and olefin and products of the amination reaction leaving the reaction zone, returning the separated catalyst to the slurry-forming operation, supplying ammonia and catalyst of high selective amination activity to said slurry, and discharging a portion of the slurry from the cycle including said reaction zone.

2. In the amination of olefins wherein an olefin and ammonia are reacted at an elevated temperature and pressure in the presence of a finely divided catalyst capable of selectively promoting the amination reaction, the improvement which comprises forming a slurry of the catalyst in liquid ammonia, delivering a portion of the slurry in further admixture with an olefin to an amination reaction zone, returning to the slurry-forming operation the catalyst separated from unreacted ammonia, olefin and amination products leaving the reaction zone, delivering another portion of the slurry to a catalyst reactivating zone, removing the ammonia from the catalyst, effecting reactivation of the resulting substantially ammonia-free catalyst by passing through a body of said catalyst a gaseous medium capable of reactivating catalyst of degenerated selective amination activity, and returning the reactivated catalyst to the slurry-forming operation.

3. In the amination of olefins wherein an olefin and ammonia are reacted at an elevated temperature and pressure in the presence of a finely divided catalyst capable of selectively promoting the amination reaction, the improvement which comprises forming a slurry of the catalyst in liquid ammonia, delivering a portion of the slurry in further admixture with an olefin to an amination reaction zone, returning to the slurry-forming operation the catalyst separated from unreacted ammonia, olefin and amination products leaving the reaction zone, delivering another portion of the slurry to a catalyst reactivating zone, removing the ammonia from the catalyst, effecting reactivation of the resulting substantially ammonia-free catalyst by passing through a body of said catalyst a gaseous medium capable of reactivating catalyst of degenerated selective amination activity, forming a slurry of the reactivated catalyst in liquid ammonia, and returning the slurry of reactivated catalyst to the slurry-forming operation.

4. In the amination of olefins wherein an olefin and ammonia are reacted at an elevated temperature and pressure in the presence of a finely divided catalyst capable of selectively promoting the amination reaction, the improvement which comprises forming a slurry of the catalyst in liquid ammonia, delivering a portion of the slurry in further admixture with an olefin to a reaction zone maintained under a pressure of the order of about 1000–3000 pounds per square inch wherein the mixture is heated to an elevated temperature to effect the amination reaction, releasing the pressure on the mixture leaving the reaction zone, separating catalyst from the mixture of unreacted ammonia and olefin and products of the amination reaction under said released pressure, returning the separated catalyst to the slurry-forming operation, supplying ammonia and catalyst of high selective amination activity to said slurry-forming operation, and discharging a portion of said slurry from the cycle including said reaction zone.

5. In the amination of olefins wherein an olefin and ammonia are reacted at an elevated temperature and pressure in the presence of a finely divided catalyst capable of selectively promoting the amination reaction, the improvement which comprises forming a slurry of the catalyst in liquid ammonia, delivering a portion of the slurry in further admixture with an olefin to an amination reaction zone maintained under a pressure of the order of about 3000 pounds per square inch, releasing the pressure on the mixture leaving the reaction zone, returning to the slurry-forming operation the catalyst separated from unreacted ammonia, olefin and amination products under said released pressure, delivering another portion of the slurry to a catalyst reactivating zone, removing the ammonia from the catalyst, effecting reactivation of the substantially ammonia-free catalyst by passing through a body of said catalyst a gaseous medium capable of reactivating catalyst of degenerated selective amination activity, and returning the reactivated catalyst to the slurry-forming operation.

6. The method of effecting amination of an olefin with ammonia at an elevated temperature and pressure in the presence of a finely divided catalyst of sustained high selective amination activity which comprises forming and maintaining a slurry of the catalyst in liquid ammonia, continuously charging the slurry in further admixture with an olefin to an amination reaction zone, separating catalyst from the mixture leaving the amination reaction zone, returning the separated catalyst to the slurry-forming operation, intermittently withdrawing a portion of the slurry, subjecting the catalyst of the intermittently withdrawn portion of the slurry to reactivation for the production of a catalyst of high selective amination activity, and returning the reactivated catalyst to the slurry-forming operation.

7. The method of effecting amination of an olefin with ammonia at an elevated temperature and pressure in the presence of a finely divided catalyst of sustained high selective amination activity which comprises forming and maintaining a slurry of the catalyst in liquid ammonia, continuously charging the slurry in further admixture with an olefin to an amination reaction zone, separating catalyst from the mixture leaving the amination reaction zone, returning the separated catalyst to the slurry-forming operation, intermittently withdrawing a portion of the slurry, subjecting the catalyst of the intermittently withdrawn portion of the slurry to reactivation for the production of a catalyst of high selective amination activity, and returning the reactivated catalyst to the slurry-forming operation, the amination reaction zone being maintained at a pressure of the order of about 1000–3000 pounds per square inch and all of the other operations being carried out under a pressure not substantially in excess of about 300 pounds per square inch.

JOHN W. TETER.